(12) United States Patent
Chou

(10) Patent No.: US 6,445,381 B1
(45) Date of Patent: Sep. 3, 2002

(54) METHOD FOR SWITCHING KEYPAD

(75) Inventor: Chin-Wen Chou, Taipei (TW)

(73) Assignee: Shin Jiuh Corporation, Taipei Hsien (TW)

(*) Notice: Subject to any disclaimer, the term of this patent is extended or adjusted under 35 U.S.C. 154(b) by 0 days.

(21) Appl. No.: 09/521,779

(22) Filed: Mar. 9, 2000

(51) Int. Cl.[7] .................................................. G09G 5/00

(52) U.S. Cl. ..................... 345/168; 341/22; 345/156; 345/170; 345/172

(58) Field of Search ................................ 345/168, 170, 345/156, 172; 341/26, 22, 175; 710/100

(56) References Cited

U.S. PATENT DOCUMENTS

| | | | | |
|---|---|---|---|---|
| 6,011,495 A | * | 1/2000 | Chen | 341/22 |
| 6,084,576 A | * | 4/2000 | Leu et al. | 345/168 |
| 6,070,204 A | * | 5/2000 | Poisner | 710/100 |
| 6,181,262 B1 | * | 1/2001 | Bennett | 341/175 |

* cited by examiner

Primary Examiner—Steven Saras
Assistant Examiner—Christopher J Maier
(74) Attorney, Agent, or Firm—Bacon & Thomas

(57) ABSTRACT

A method for switching a keypad is to adopt an externally coupled keypad to a personal computer, wherein a switching program for switching between a hot-key function and a Num Lock function is programmed in a microprocessor of the keypad; when a hot-key or a Num Lock key is pressed, the hot-key function or the Num Lock function is enabled. Besides, every key of the keypad is printed with a figure and a symbol for performing at least two functions.

5 Claims, 3 Drawing Sheets

METHOD FOR SWITCHING KEYPAD

BACKGROUND OF THE INVENTION

This invention relates to a method for switching a numeric keypad, particularly to a method for switching an externally coupled numeric keypad, or the numeric keypad of a conventional keyboard, to provide additional key functions.

A keyboard of a notebook computer or a conventional keyboard software works with most average software. However, when more demanding new software is loaded, some peripheral equipment, such as the above-mentioned keyboard, may become unavailable. For example, if the software WIN2000 is loaded in a computer, some 20 hot-key functions that cannot be executed efficiently with an existing keyboard are added. In such a situation, a user may endure the inconvenience of a limited operational space or decide to change to an alternative keyboard.

SUMMARY OF THE INVENTION

The primary object of this invention is to provide a numeric keypad externally coupled with a personal computer, wherein a functional program for switching a hot-key to a Num Lock key or vice versa is programmed in a microprocessor of the keypad; when the hot-key or the Num Lock key is pressed, the program will switch automatically to a hot-key function or a Num Lock function; and every key cap in the keypad is printed with a figure or symbol representing at least two functions.

Another object of this invention is to provide a numeric keypad externally coupled with a personal computer or a numeric keypad of an otherwise conventional keypad, wherein a hot-key and a Num Lock key coexist in a common key; or, optionally, a switching program is programmed in a microprocessor of a conventional keyboard so that a hot-key lamp is lighted, and a hot-key function is enabled, when pressing the common key the first time; similarly, a Num Lock lamp is lighted and a Num Lock function is enabled when pressing the common key the second time; and, both the hot-key lamp and the Num Lock lamp are turned off and the arrow keys of the keypad are made available when pressing the common key the third time.

Yet another object of this invention is to adopt an externally coupled keypad in view of advantages in portability.

For realizing the abovesaid objects, the switching program of this invention first scans all the keys of the keypad and memorizes whether the hot-key or the Num Lock key is pressed; if a key is found pressed, the program will read the address of the pressed key to make sure whether the hot-key is pressed or not; if "Yes," it is supposed to send out a hot-key code for execution of the hot-key function, otherwise, it will judge whether the Num Lock key is pressed or not; if "Yes," it is supposed to send out a figure code, or a normal key code otherwise.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows.

DETAILED DESCRIPTION OF THE PREFERRED EMBODIMENT

Figure 1:
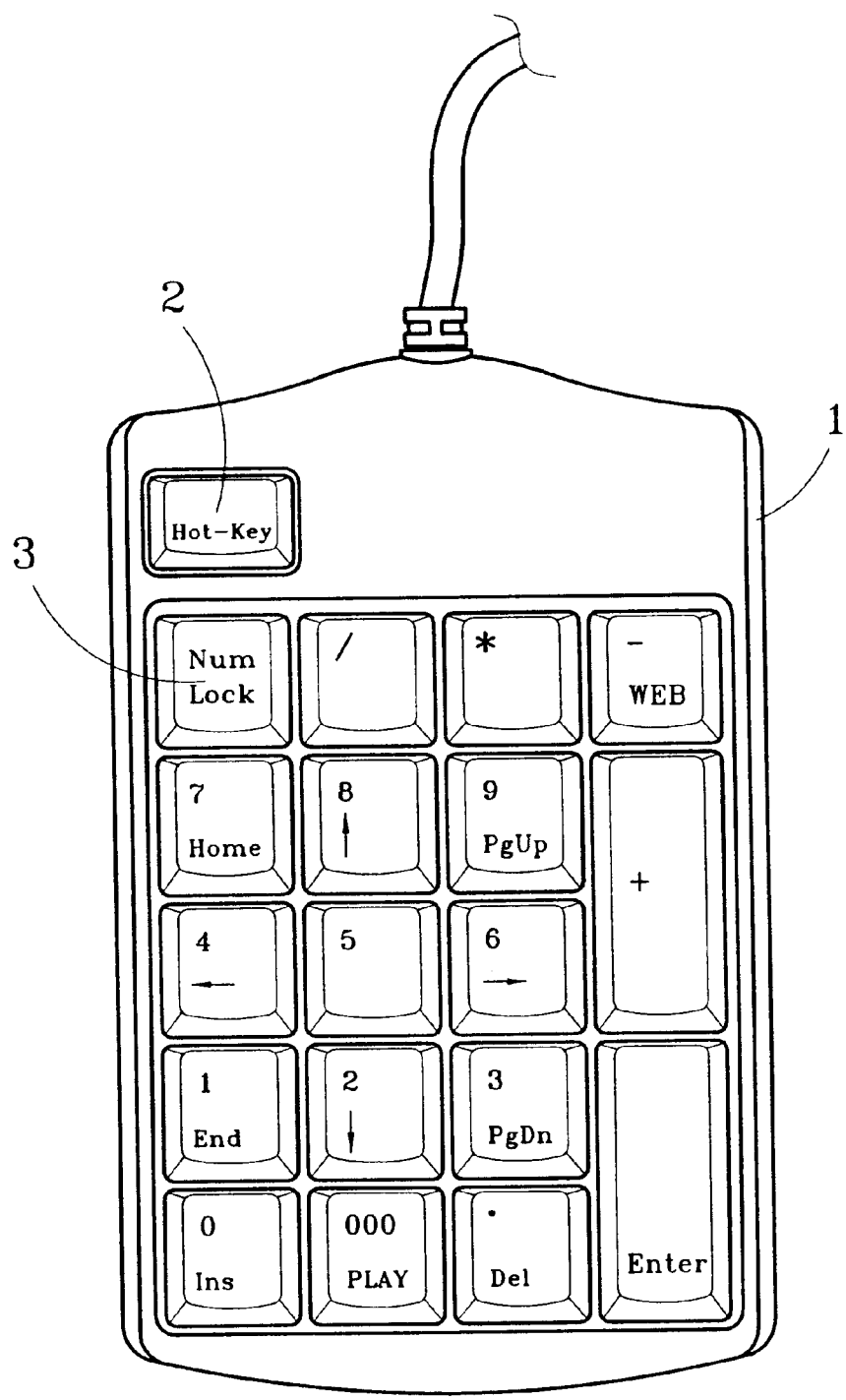
FIG. 1 is a schematic front view of a keypad of this invention.
Figure 2:
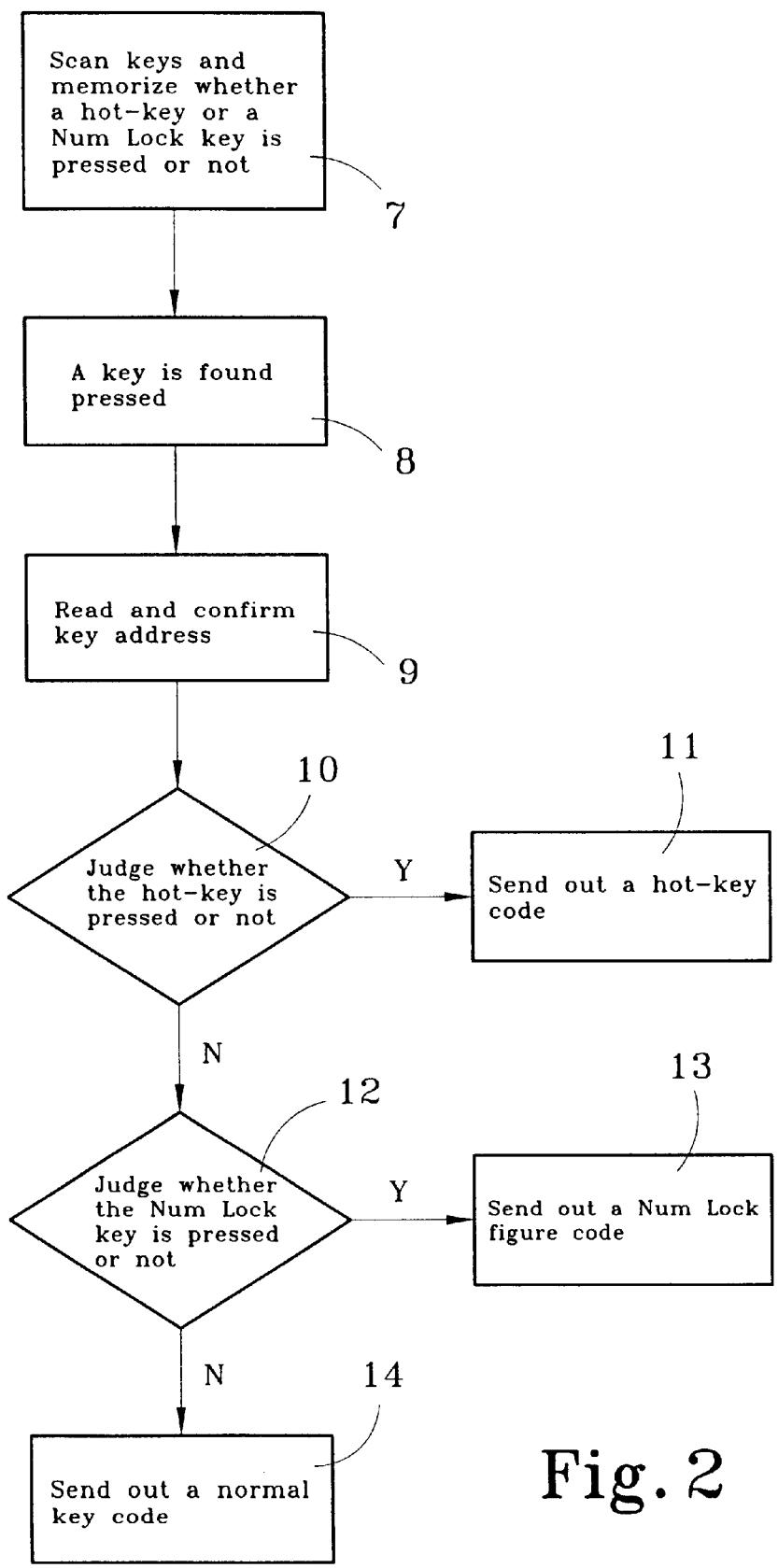
FIG. 2 is a flowchart of a switching program of this invention.
Figure 3:
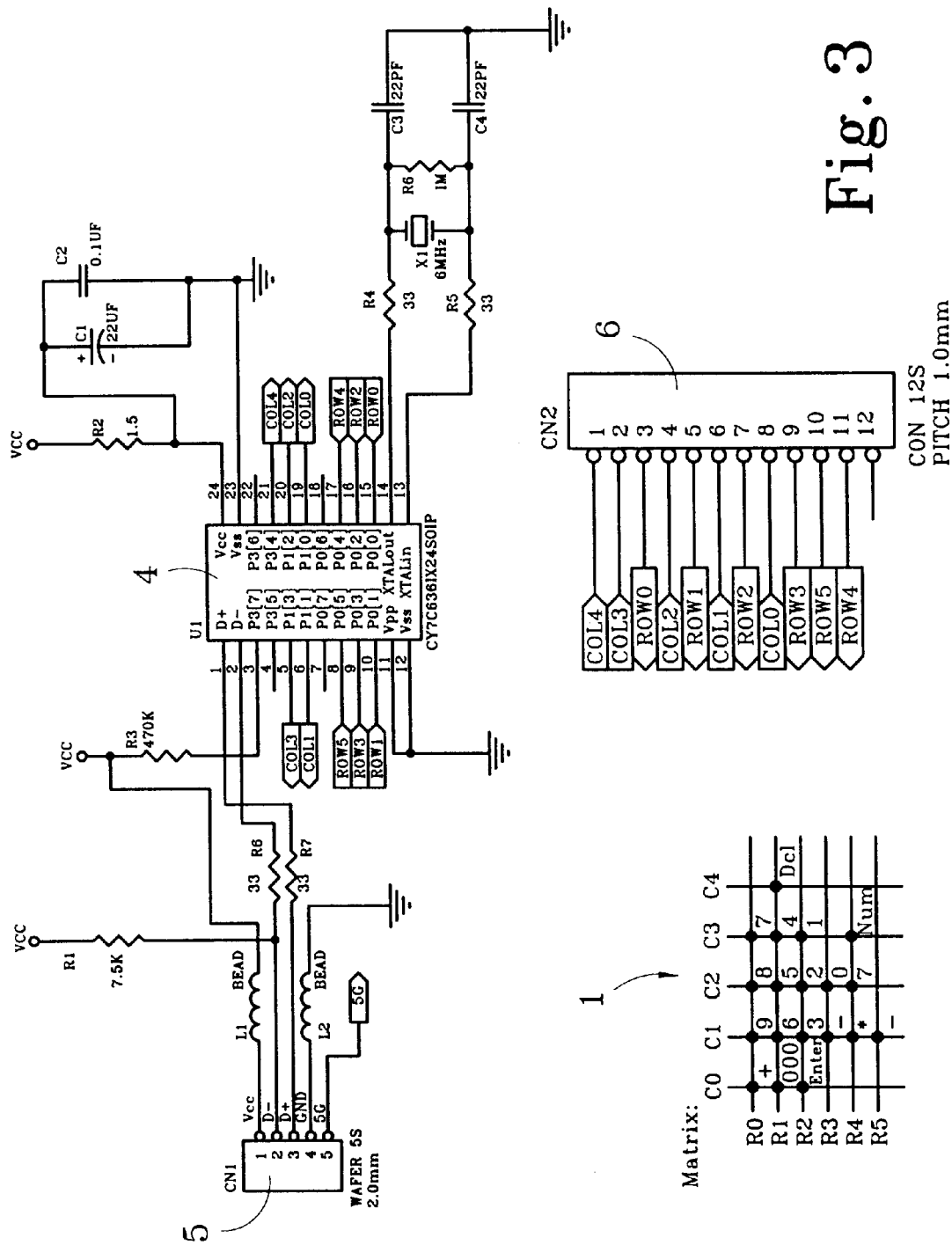
FIG. 3 is a circuit diagram of the keypad of this invention.

Referring to FIG. 1 through FIG. 3, a hot-key 2 added to a keypad 1 of this invention communicates with the keypad 1 via a USB (Universal serial buffer) interface, the hot-key 2 or a Num Lock key 3 in the keypad 1 being started alternatively by a switching program.

The switching program is programmed in a microprocessor 4 shown in FIG. 3, wherein a first connector 5 offered with a USB coupling is provided for plugging the keypad 1 in a personal computer; a second connector 6 is coupled with the keypad 1, which is scanned by the microprocessor 4; and meanwhile, the microprocessor 4 detects the hot-key 2 and the Num Lock key 3 from time to time, and a key code will be sent out if any key of the keypad 1 is found pressed.

The switching program is designed to take the hot-key 2 as the first priority. In its scanning process, the program will memorize if the hot-key 2 or the Num Lock key 3 is pressed 7. When a key is pressed 8, the program will read the address of the pressed key 9 to make sure whether the hot-key 2 is pressed or not 10; if "Yes," it send out a hot-key code 11 to enable a hot-key function to become executable, otherwise, it judges whether the Num Lock key 3 is pressed 12; if "Yes," it sends out a Num Lock figure code 13; otherwise, a normal key code 14 will be sent out instead.

For example, if the Num Lock key 3 is pressed, then a user can press the keys of the keypad 1 for operation of addition, subtraction, multiplication, and division. After the hot-key is pressed, the keys of the keypad 1 carry out a hot-key function, for instance, the user may press a "Play" key for watching movies or a "Web" key for web linkage. Every keycap of the keypad 1 is printed with a figure and a symbol for performing at least two functions.

Moreover, the hot-key 2 and the Num Lock key 3 may coexist in a common key; or, optionally, the switching program may be programmed in a microprocessor of a conventional keyboard so that a hot-key lamp is lighted and a hot-key function is enabled when pressing the common key the first time; similarly, a Num Lock lamp is lighted and a Num Lock function is enabled when pressing the common key the second time; and, both the hot-key lamp and the Num Lock lamp are turned off and the arrow keys of the keypad 1 are available when pressing the common key the third time.

In short, the keypad 1 of this invention is designed to accommodate a demanding new program for easy operation of a personal computer without key count problem, and the externally coupled keypad 1 is particularly advantageous in portability.

What is claimed is:

1. A method for switching a numeric keypad having a switching program programmed in a microprocessor of the keypad for switching keys in the keypad between one of three functions: a hot-key function, a Num Lock function, and a normal key function, the method comprising:

a) scanning keys of the numeric keyboard, memorizing whether a hot-key or a Num Lock key has been pressed and, if any key in the keypad is pressed, reading the key address;

b) judging whether said hot-key is pressed or not after confirmation of the key address and, if pressed, sending out a hot-key code and enabling said hot-key function or judging whether said Num Lock key is pressed; and c) sending out a Num Lock figure code if said Num Lock key is pressed, otherwise, sending out a normal key code.

2. The method for switching a keypad according to claim 1, wherein every keycap of said keypad is printed with a figure and a symbol for performing at least two functions.

3. The method for switching a keypad according to claim 1, wherein said hot-key and said Num Lock key coexist in a common key.

4. The method for switching a keypad according to claim 3, wherein said switching program is programmed in a microprocessor of a conventional keyboard; a hot-key lamp is lighted and said hot-key function is enabled when pressing the common key the first time; similarly, a Num Lock lamp is lighted and said Num Lock function is enabled when pressing the common key the second time; and, both said hot-key lamp and said Num Lock lamp are turned off and said hot-key function and said Num Lock function are disabled and the arrow keys of the keypad are available when pressing the common key the third time.

5. The method for switching a keypad according to claim 1, wherein said keypad is an externally coupled keypad provided with a USB interface for plugging in a personal computer.

* * * * *